United States Patent [19]

Lodjic

[11] 3,728,754
[45] Apr. 24, 1973

[54] VERTICALLY ADJUSTABLE LOADING RAMP APPARATUS

[75] Inventor: Carl L. Lodjic, Long Beach, Calif.

[73] Assignee: Global Erectors, Inc., Long Beach, Calif.

[22] Filed: July 16, 1971

[21] Appl. No.: 163,342

[52] U.S. Cl. .................................................. 14/71
[51] Int. Cl. ............................................. B65g 11/00
[58] Field of Search ........................................ 14/71

[56] References Cited

UNITED STATES PATENTS

| | | | |
|---|---|---|---|
| 2,875,457 | 3/1959 | Read | 14/71 |
| 3,099,847 | 8/1963 | Lodjic | 14/71 |
| 3,184,772 | 5/1965 | Moore | 14/71 |
| 3,341,875 | 9/1967 | Wollard | 14/71 |
| 3,377,638 | 4/1968 | Seipos | 14/71 |
| 3,378,868 | 4/1968 | Wollard | 14/71 |
| 3,422,477 | 1/1969 | Riggles | 14/71 |
| 3,462,785 | 8/1969 | Seipos | 14/71 |
| 3,538,529 | 11/1970 | Breier | 14/71 |

*Primary Examiner*—Nile C. Byers, Jr.
*Attorney*—Fulwider, Patton, Rieber, Lee & Utecht

[57] ABSTRACT

A vertically adjustable loading ramp apparatus for use with first and second aircraft having respective first and second sets of entryway sills disposed at respective first and second heights, at least one of such sets including a pair of entryway sills spaced apart a selected distance. A horizontal main ramp extends longitudinally of an aircraft loading area and is adjustable from a first horizontal position disposed at substantially the first height to a second horizontal position disposed at substantially the second height. The main ramp is connected with the terminal structure by means of an approach ramp which is adjustable to enable the main ramp to be shifted between the first and second positions. A pair of mating ramps are disposed longitudinally along the main ramp for mating with the respective first and second sets of entryway sills and extend transversely from such main ramp to terminate in doorways for mating with the respective first and second entryways of the one set. Drive means is provided for shifting the main ramp vertically between the first and second positions whereby the main ramp will be maintained horizontal while in both the first and second positions to thereby enable the mating ramps to align with the respective aircraft entryways.

9 Claims, 9 Drawing Figures

Patented April 24, 1973

INVENTOR.
CARL L. LODJIC

BY Fulwider, Patton, Rieber,
Lee and Utecht
ATTORNEYS

Patented April 24, 1973

INVENTOR.
CARL L. LODJIC

BY Fulwider, Patton, Rieber
Lee and Utecht
ATTORNEYS

Patented April 24, 1973

INVENTOR.
CARL L. LODJIC
BY Fulwider, Patton, Rieber, Lee and Utecht
ATTORNEYS

VERTICALLY ADJUSTABLE LOADING RAMP APPARATUS

BACKGROUND OF THE INVENTION

1. Field of the Invention:

The present invention relates to loading ramps for loading and unloading passengers from aircraft.

2. Description of the Prior Art:

With the advent of numerous models of different commercial jets, such as Boeing 707's and 747's, which have their entryways disposed at different heights and frequently spaced apart at different spacings, it has become common practice to either provide vertically adjustable transfer vehicles for transporting passengers between the aircraft and air terminal or to provide separate stationary custom designed ramps for each model of aircraft. The former procedure results in an undue time delay and expense in loading and unloading the aircraft and the latter procedure requires the investment of large sums of money for installation of separate ramps for each model of airplane which has its entryway disposed at different heights. This latter procedure suffers the further shortcoming of requiring rather sophisticated logistics for scheduling the arrival and departures of particular models of aircraft at the ramp specially designed therefore and frequently results in failure to make full use of certain ramps for aircraft models not having a heavy schedule of arrival and departure at particular airports while overloading other ramps.

Provision of a ramp that is merely pivotally mounted on one end from the terminal so the opposite end thereof may be raised and lowered does not fully solve the problem since the ramp would extend at a substantial slope for mating with certain models of aircraft thereby placing doors opening to the side of such ramp at different elevations so they would not mate with aircraft forward and aft entryways disposed at the same height.

SUMMARY OF THE INVENTION

The vertically adjustable loading ramp apparatus of present invention is characterized by a horizontal main ramp which is connected with the airport terminal by means of an approach ramp which enables the main ramp to be adjusted vertically between various heights while being maintained horizontal to mate with the entryways of different aircraft even though such entryways are disposed at different heights.

The object and advantages of the present invention will become apparent from a consideration of the following detailed description when taken in conjunction with the accompanying drawings.

DESCRIPTION OF THE PREFERRED EMBODIMENTS

Figure 1:
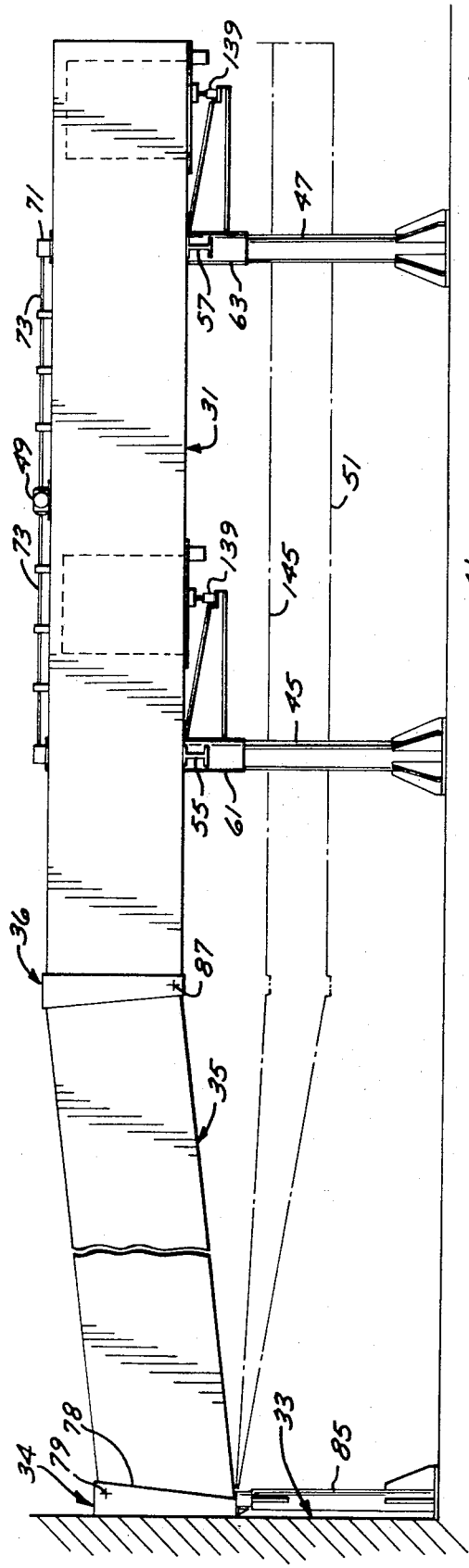
FIG. 1 is an elevational view of a vertically adjustable loading ramp apparatus embodying the present invention.
Figure 2:
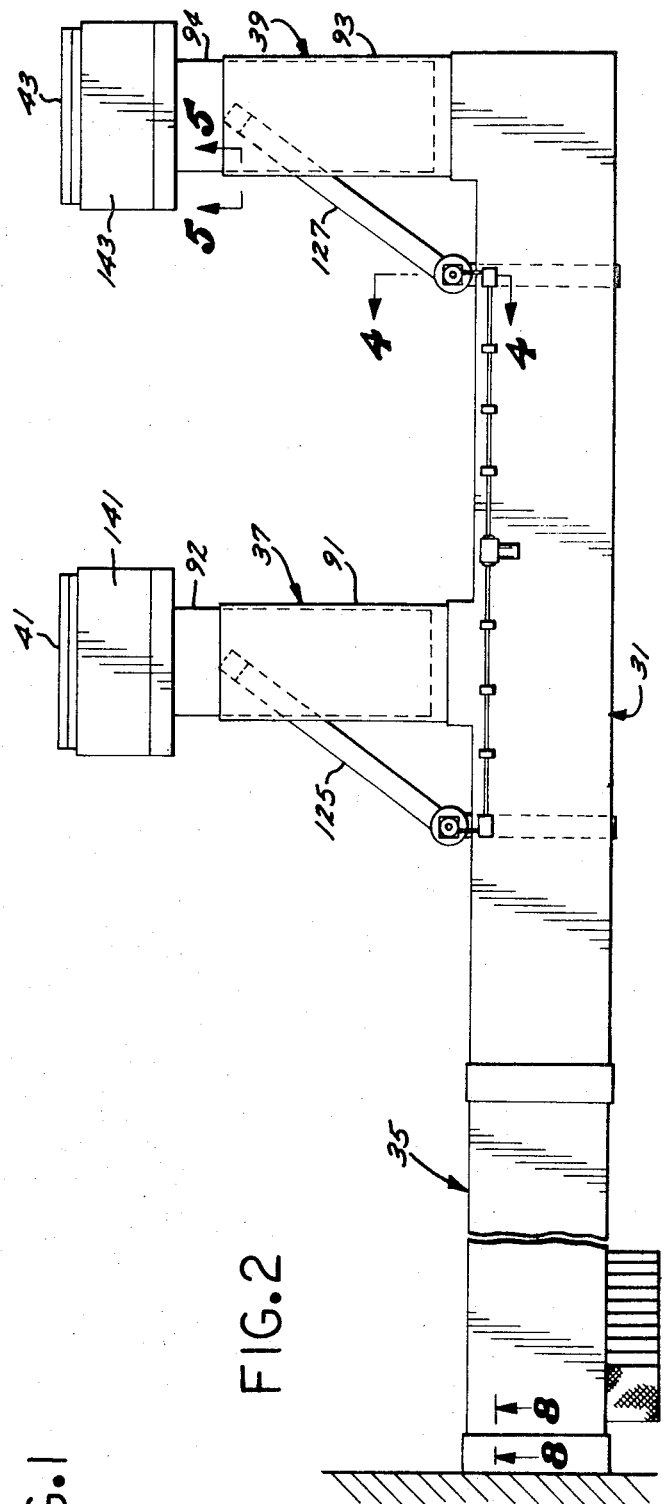
FIG. 2 is a top plan view of the vertically adjustable loading ramp apparatus shown in FIG. 1.

Referring to FIGS. 1 and 2, the vertically adjustable loading ramp apparatus of present invention includes, generally, a horizontally extending main ramp 31 which is connected on one extremity with the passenger doorway of a terminal building 33 by means of an approach ramp 35 that includes articulated connecting joints 34 and 36 on its opposite ends to accommodate the vertical adjustment of such main ramp. A pair of mating ramps, generally designated 37 and 39, are carried from the main ramp 31 and project transversely therefrom and terminate in respective ramp doorways 41 and 43 which mate with respective entryways in mating aircraft. The main ramp 31 is carried from support posts 45 and 47 and is adjustable vertically upwardly and downwardly thereon by means of an adjustment drive motor 49 which controls vertical adjustment of both posts 45 and 47 to maintain such ramp disposed horizontally. Consequently, a relatively high aircraft, such as a Boeing 747, may be brought adjacent the ramp 31 and the adjustment drive motor 49 actuated to raise such ramp to the solid line position shown in FIG. 1 to align the mating ramp doorways 41 and 43 with the entryways of such aircraft. Similarly, when a smaller aircraft, such as a Boeing 727 is brought along side the main ramp 31, the adjustment drive motor 49 may be actuated to lower the main ramp 31 to the broken line position 51 shown in FIG. 1 to dispose the mating doorways 41 and 43 at the height of the 727 doorways. The entry door sills of a Douglas DC-9 model aircraft are at a height which disposes them approximately nine feet lower than the door sills of a Boeing model 747 aircraft thereby making it desirable to have the main ramp 31 shiftable from a lower position depicted by the broken line position 51 to the solid line position disposed at least nine feet thereabove.

Figure 4:
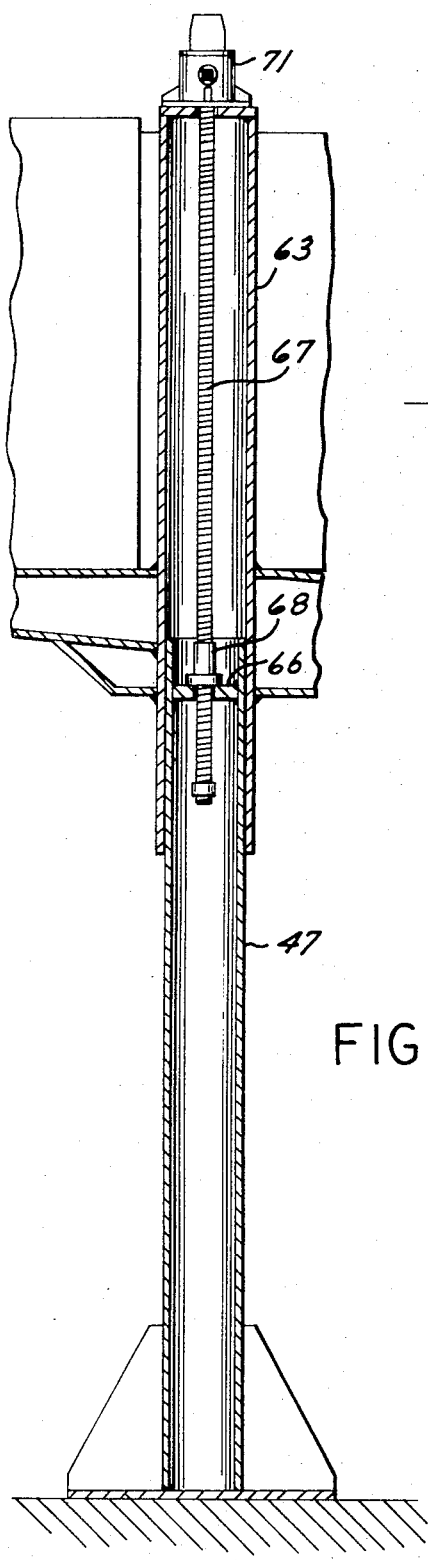
FIG. 4 is a vertical sectional view, in enlarged scale, taken along the line 4—4 of FIG. 2.

The main ramp 31 is in the form of a rectangular-in-vertical-cross section tunnel which is carried on transversely extending I-beams 55 and 57 (FIG. 1) that are, in turn, supported on their respective on extremities from respective female sleeves 61 and 63 that are telescoped over the upper extremities of the respective support posts 45 and 47. Referring to FIG. 4, the support posts 45 and 47 and sleeves 61 and 63 are hollow for receipt of respective adjustment screws 67 for controlling telescoping of such sleeves, the posts including respective mounting plates 66 in the upper extremities thereof. Ball screws 68 are affixed to the respective plates 66 and screwed therethrough are the respective drive screws 67, the upper extremities of such screws being coupled with the output of respective gear housing 71, the input to such gear housings being coupled with respective drive shafts 73 projecting in opposite directions from the drive motor 49 (FIG. 1).

Figure 8:
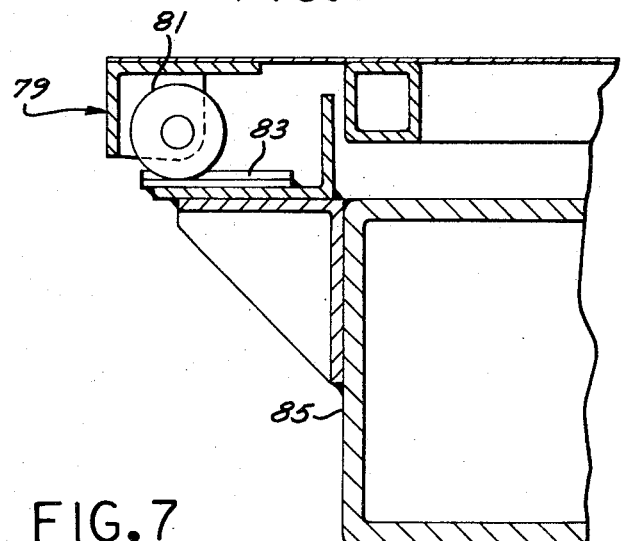
FIG. 8 is a vertical sectional view, in enlarged scale, taken along the line 8—8 of FIG. 2.

Referring to FIGS. 1 and 8, the approach ramp 35 is in the form of a rectangular-in-vertical-cross section tunnel. The articulated joint 34 connecting such approach ramp 35 to the terminal structure 33 includes an upper pivot element defining a transverse axis 79 and a lower sliding element in the form of a roller 81 (FIG. 8) that carries the terminal end of the ramp 35 and rolls on a longitudinally extending hardened steel track 83 which is mounted on a support post assembly 85.

The articulated joint 36 connecting the opposite end of such approach ramp 35 with the main ramp 31 includes a lower pivot element that defines a transverse pivot axis 87, the upper portion of such articulated joint being in the form of an expanding and contracting element.

Figure 5:
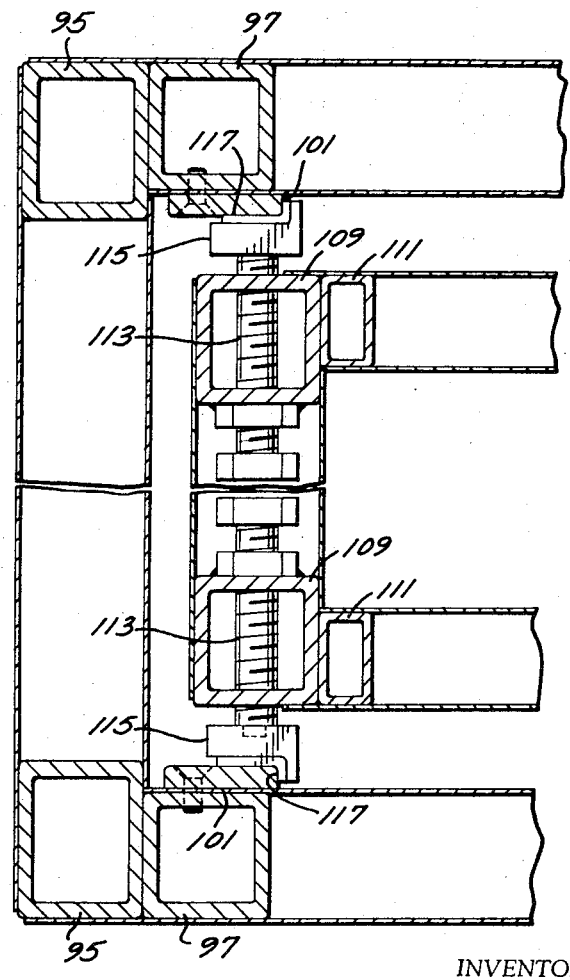
FIG. 5 is a broken vertical sectional view, in enlarged scale, taken along the line 5—5 of FIG. 2.

Referring to FIGS. 2 and 5, the mating ramps 37 and 39 include respective dual-walled female tunnel sections 91 and 93 which have male tunnel sections 92 and 94 telescoped thereinto. The female tunnel sections 91 and 93 are formed by framework in the form of corner channels 95 and 97 (FIG. 5) that have the respective inner and outer dual walls carried therefrom. Mounted in the interior of such female tunnel sections 91 and 93 are respective longitudinal tracks 101 (FIG. 5) from which the inner extremities of the respective male mating ramp tunnel sections 92 and 94 (FIG. 2) are supported. The male tunnel sections 92 and 94 are also dual-walled and have framework in the form of corner channels 109 and 111 from which the respective dual walls are carried. Still referring to FIG. 5, respective adjustment bolts 113 are screwed through threaded bores in the respective channels 109 and have respective sliders 115 pivotally connected to their outer extremities, such sliders being formed with a somewhat L-shaped cutaway portion that is lined with a Teflon liner 117 for low friction sliding on the respective track 101. Consequently, the adjustment bolts 113 may be adjusted to maintain the sliders 115 urged against the respective tracks 101 to hold the male tunnel sections 92 and 94 firmly in place for telescopical adjustment in the respective female tunnel sections 91 and 93.

Figure 3:
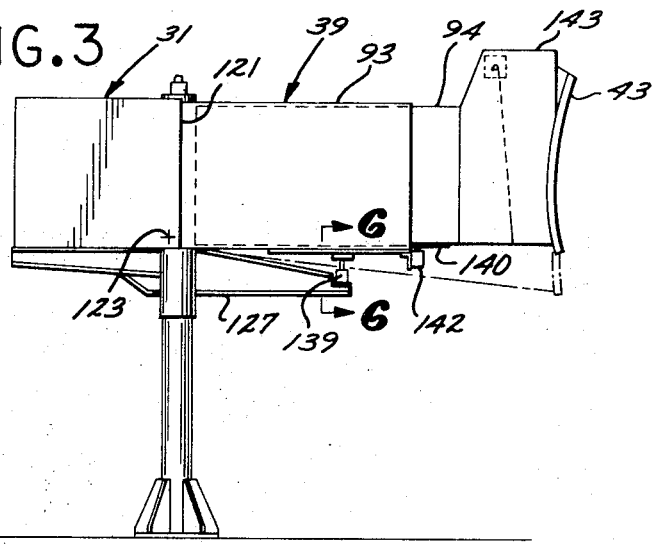
FIG. 3 is a right end view of the vertically adjustable loading ramp apparatus shown in FIG. 2.

Referring to FIG. 3, the rear extremities of the respective mating ramps 37 and 39 are connected to respective rectangular frames 121 formed in the side wall of the main ramp 31 by means of respective lower pivot joints that define transverse pivot axes 123 which enable the projecting extremities of such ramps to be raised and lowered. The projecting extremities of the mating ramps 37 and 39 are carried on the outer extremities of respective angled cantilever beams 125 and 127 (FIGS. 2 and 3), such beams being carried on their inner extremities from the respective female support post sleeves 61 and 63.

Figure 6:
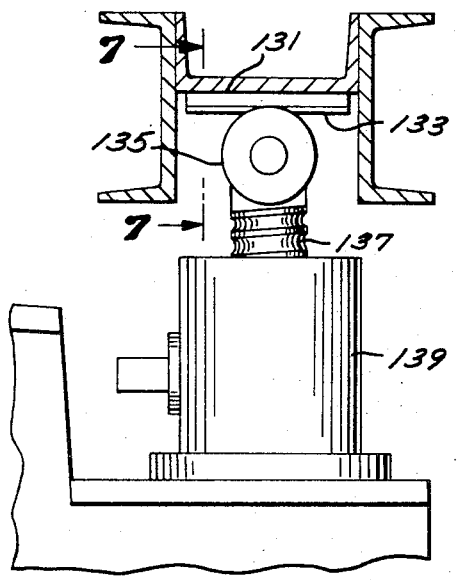
FIG. 6 is a vertical sectional view, in enlarged scale, taken along the line 6—6 of FIG. 3.
Figure 7:
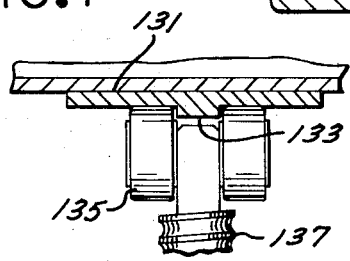
FIG. 7 is a vertical sectional view taken along the line 7—7 of FIG. 6.

Referring to FIGS. 6 and 7, an elongated track 131 is mounted on the under side of the respective ramps 37 and 39 and such tracks are formed with respective central ridges 133 guiding respective roller assemblies 135 therealong. The roller assemblies 135 are carried from the respective vertical screws 137 of screw jacks 139 supported from the outer extremities of the respective cantilever support beams 125 and 127. Consequently, the jacks 139 may be energized to raise or lower the respective screws 137 to correspondingly raise or lower the projecting extremities of the respective mating ramps 37 and 39. The male mating ramp sections 92 and 94 are telescoped inwardly and outwardly in the female ramp sections 91 and 93 by means of elongated drive screws 140 (FIG. 3) that are driven by respective drive motors 142.

The projecting extremities of the mating ramps 37 and 39 are formed with respective door housings 141 and 143 which have the respective mating doorways 41 and 43 formed in the outer portions thereof, such doorways being articulated in a conventional manner to accommodate the different contours and disposition of different aircraft.

Figure 9:
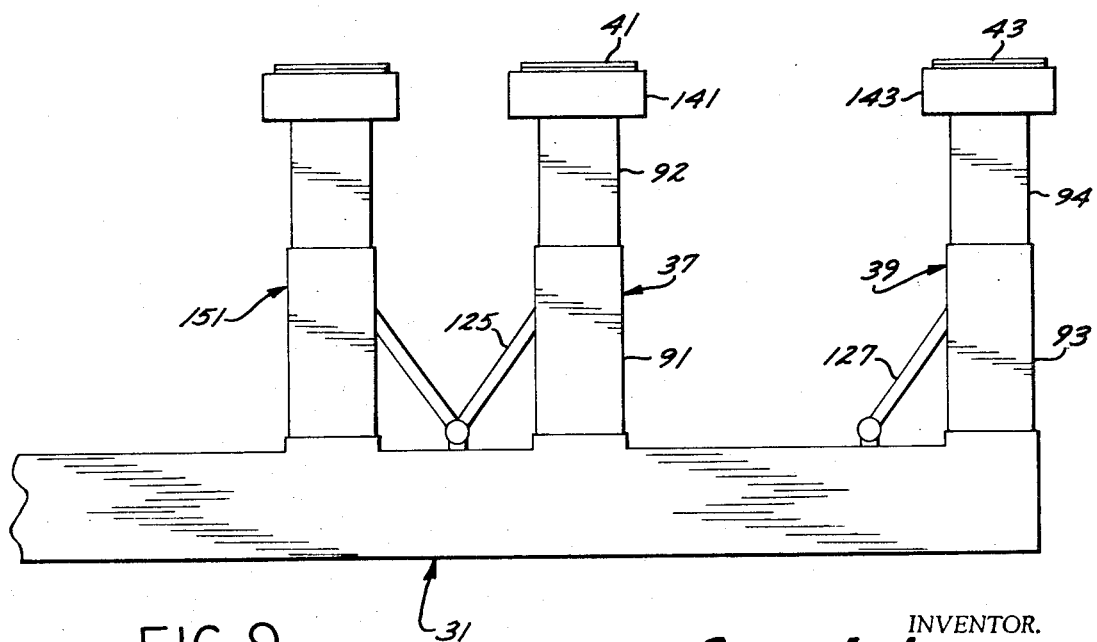
FIG. 9 is a top plan view of a second embodiment of the vertically adjustable loading ramp apparatus of present invention.

In operation, the vertically adjustable loading ramp of present invention may be utilized by connecting the articulated joint 34 of the approach ramp 35 with the passenger door 78 of an air terminal 33 for articulation about the transverse axis 79 (FIG. 9). Preferably, the drive motor 49 is connected with a control panel that includes individual controls for automatically setting the height of the main ramp 31 to accommodate the elevation of the particular models of aircraft to be utilized therewith. For example, when the ramp apparatus is to be utilized for loading or unloading a relatively low aircraft, the control therefore will be actuated and the drive motor 49 will rotate the drive rods 73 to actuate the respective heights adjustment screws 67 in synchronism to synchronously lower the respective support post sleeves 61 and 63 on the support posts 45 and 47 to lower the main ramp 31 to the broken line position shown in FIG. 1. During lowering of such ramp 31, the articulated joints 34 and 36 of the approach ramp 35 will enable such approach ramp to pivot about the pivot axis 79 and 87 (FIG. 1) while the rollers 81 roll inwardly along the respective tracks 83 (FIG. 8) to the position shown in FIG. 8. The main ramp 31 will thus be maintained extending horizontally while being lowered to maintain the mating ramps 37 and 39 at approximately the same elevation for convenient mating with the aircraft entry doors.

With the aircraft parked along the main ramp 31 and the entryways thereof in vertical alignment with the doorways 41 and 43, the control button corresponding with the particular model airplane may be depressed to actuate the drive motor 49 and automatically lower the main ramp 31 to the broken line position 51 shown in FIG. 1 while maintaining such ramp horizontally disposed. If the aircraft is on an incline from front to rear, one or the other of the respective mating ramp adjustment jacks 139 may be actuated to extend or retract the associated screw 137 to extend or retract the roller assembly 135 carried thereon to correspondingly raise or lower the projecting extremity of the mating ramps 37 or 39. For smaller aircraft it may be desirable to use only one mating ramp 37 or 39, and such ramp is telescoped outwardly to mate with the entryway of the aircraft by actuating the corresponding drive motor 140 (FIG. 3) to telescope the respective male ramp section 92 or 94 outwardly to engage the aircraft.

When an airplane of intermediate height is brought into the aircraft loading area adjacent the main ramp 31, the control button corresponding with that model of airplane will be pressed to actuate the drive motor 49 to rotate the drive shaft 73 and adjustment screws 67 to extend the support posts sleeves 61 and 63 on the respective support posts 45 and 47 to raise the main ramp 31 at a uniform speed at both its inner and outer extremities to thereby maintain such ramp horizontal. Such main ramp will be raised to the broken line position 145 shown in FIG. 1 to dispose the mating ramps 37 and 39 at the approximate elevation at the aircraft entryways. The operator may then actuate the individual mating ramp jacks 139 to raise or lower the associated jack screws 137 to pivot the projecting extremities of the ramps 37 and 39 about the respective transverse axis 123 (FIG. 3) to correspondingly raise or lower such projecting extremities for horizontal alignment with the aircraft entry doors. The male mating tunnel sections 92 and 94 may then be projected by actuating the respective drive motors 140 to drive the respective screws 142 outwardly to bring the doorways 41 and 43 to mating relationship with the entryways of the aircraft.

In a similar manner, when a relatively high aircraft is brought into the loading area adjacent the main loading ramp 31, the control button corresponding therewith will be pressed to actuate the drive motor 49 and raise the main ramp 31 to its upper solid line position shown in FIG. 1 to bring the mating ramp doorways 41 and 43 into approximate horizontal alignment with the entryways of such aircraft. Further vertical adjustment of the mating ramps 37 and 39 may then be accomplished to accommodate any front to rear slope in the aircraft by actuating the respective elevating jacks 139 to correspondingly raise or lower such mating ramps 37 and 39. Thereafter, the extension drive motor 140 may be actuated to extend the drive screw 142 to project the male tunnel sections 92 and 94 from the female tunnel sections 91 and 93 to engage the doorways 41 and 43 with the entryways of the aircraft.

A vertically adjustable loading ramp apparatus shown in FIG. 9 is similar to that shown in FIG. 1 except that it includes an extra mating ramp, generally designated 151, which is spaced from the loading ramp 39 a distance corresponding with the distance between the two forward entry doors of a large model airplane so such entry doors may be serviced simultaneously by such mating ramps. The mating ramps 37 and 39 are spaced apart the same distance as those in the loading apparatus shown in FIG. 1 for mating with the forward entry doors of an aircraft having such doors spaced closer together.

From the foregoing it will be apparent that the vertically adjustable loading ramp apparatus of present invention provides a convenient means for servicing a large range of different model airplanes from the same service area thereby eliminating the necessity of having separate terminal areas designed specifically for specific models of airplanes. This enables more efficient use of air terminal space and lessens the complexity of the logistics required for different aircraft at the terminal areas.

Various modifications and changes may be made with regard to the foregoing detailed description without departing from the spirit of the present invention.

I claim:

1. Vertically adjustable loading ramp apparatus for use with first and second aircraft having respective first and second doorway sills spaced apart a selected distance and disposed at respective first and second heights and comprising:

a horizontal main ramp extending longitudinally of a loading space for said aircraft and selectively adjustable from a first horizontal position disposed at substantially said first height and a second horizontal position disposed at substantially said second height;

support means supporting said main ramp in said first and second positions and including first and second support posts means spaced longitudinally along said main ramp and including respective first and second adjustment means for adjusting said main ramp between said first and second positions;

synchronizing means interconnecting said first and second adjustment means and coupled with said drive means for raising and lowering the opposite extremities of said main ramp at the same rate;

structure, approach ramp connected on one end with said main ramp and on the opposite end with a terminal structure said approach ramp being adjustable to enable said main ramp to be shifted between said first and second positions;

a pair of mating ramps spaced along said main ramp connected on one end therewith, extending transversely therefrom and terminating in doorways for mating with the respective first and second doorways of said aircraft.

2. Loading ramp apparatus as set forth in claim 1 wherein:

said mating ramps include respective telescopical means for telescoping said mating ramps and respective drive means for extending and retracting said mating ramps.

3. Vertically adjustable loading ramp apparatus as set forth in Claim 1 for use with a third aircraft having an entry door of a third height and wherein:

said main ramp is selectively adjustable to a third vertical level disposing one of said doorways at said third height for mating with said entry door off said third aircraft.

4. Loading ramp apparatus as set forth in claim 1 for use with a third aircraft having doors spaced apart a selected distance and including:

a third mating ramp spaced from said first mating ramp and projecting transversely from said main ramp and terminating in a mating opening spaced said selected distance from the doorway of said first mating ramp.

5. Loading ramp apparatus as set forth in claim 1 that includes:

first and second angularly adjustable connecting means connecting said first and second mating ramps with said main ramp;

first and second support means supporting the projecting extremities of said mating ramps and including respective first and second jack means for adjusting the vertical location of the respective mating doors with respect to said main ramp.

6. Loading ramp apparatus as set forth in claim 1 wherein:

said support means includes a plurality of vertical hollow support posts including respective male and female post sections telescoped together for vertical telescopical adjustment, one of said sections including anchor means and the other of said sections including an internally threaded boss; and said drive means includes respective elongated screws rotatable connected on their respective one ends with said anchor means and having their respective opposite extremities screwed into said respective bosses, and drive motor means being connected with said screws for rotating said screws simultaneously for simultaneous telescopical adjustment of said respective posts.

7. Vertically adjustable loading ramp apparatus for connection with an airport terminal to facilitate emplaning and deplaning of passengers from first and second aircraft parked longitudinally in an elongated loading space and including entry doors disposed at first and second heights, with the first aircraft including forward and aft entry doors spaced apart a predetermined distance, said apparatus comprising:

a horizontal main ramp projecting longitudinally of said loading space and adjustable to first and second vertical levels spaced apart a vertical distance corresponding with the vertical distance between said first and second heights;

support means supporting said main ramp and including elevating means coupled between said main ramp and support means and operative to adjust said main ramp between said first and second levels, said support means further including leveling means holding said horizontal ramp level at said first and second vertical levels;

an approach ramp projecting from said terminal to one end of said main ramp;

articulation means connecting one end of said approach ramp with said terminal and the opposite end with said one end of said horizontal ramp to accommodate vertical shifting of said horizontal main ramp relative to said terminal;

a pair of mating ramps suspended from said main ramp and projecting transversely therefrom to terminate in respective doorways spaced apart said predetermined distance whereby said first aircraft may be moved into position disposed longitudinally in said loading space, said elevating means operated to shift said main ramp vertically to said first height to mate said doorways with said forward and aft entry doors and alternatively said second aircraft may be moved into said loading space, said elevating means operated to shift said main ramp to said second height to shift said doors to said second level for mating of the entry door thereof with one of said doorways.

8. Vertically adjustable loading ramp apparatus as set forth in claim 7 that includes:

articulation means connecting said mating ramps with said main ramp to accommodate vertical shifting of the respective doorway ends thereof;

first and second support means supporting the free extremities of said mating ramps; and elevating means connected between said first and second support means and said free extremities for independently adjusting the vertical level of said doorways.

9. Vertically adjustable loading ramp apparatus as set forth in claim 8 that includes:

first and second telescopical means interposed between said respective doorways and said main ramp and operable to telescope said mating ramps and project said doorways independently away from said main ramp.

* * * * *

UNITED STATES PATENT OFFICE
CERTIFICATE OF CORRECTION

Patent No. 3,728,754     Dated April 24, 1973

Inventor(s) Carl J. Lodjic

It is certified that error appears in the above-identified patent and that said Letters Patent are hereby corrected as shown below:

Column 7, line 20, cancel "structure," and insert -- an -- .

Signed and sealed this 20th day of November 1973.

(SEAL)
Attest:

EDWARD M. FLETCHER, JR.
Attesting Officer

RENE D. TEGTMEYER
Acting Commissioner of Patents